(12) United States Patent
Hill et al.

(10) Patent No.: US 12,205,322 B2
(45) Date of Patent: *Jan. 21, 2025

(54) MIXED-REALITY DEVICE POSITIONING BASED ON SHARED LOCATION

(71) Applicant: Microsoft Technology Licensing, LLC, Redmond, WA (US)

(72) Inventors: Erik Alexander Hill, Woodinville, WA (US); Kathleen Carol Heasley, Redmond, WA (US); Jake Thomas Shields, Bellevue, WA (US); Kevin James-Peddicord Luecke, Seattle, WA (US); Robert Neil Drury, Seattle, WA (US); Garret Paul Jacobson, Mountlake Terrace, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,216

(22) Filed: Oct. 20, 2023

(65) Prior Publication Data

US 2024/0046511 A1    Feb. 8, 2024

Related U.S. Application Data

(63) Continuation of application No. 17/333,431, filed on May 28, 2021, now Pat. No. 11,854,223.

(51) Int. Cl.
*G06T 7/73* (2017.01)
*G01S 19/25* (2010.01)
(Continued)

(52) U.S. Cl.
CPC ............. *G06T 7/73* (2017.01); *G01S 19/25* (2013.01); *G02B 27/017* (2013.01); *G06F 3/04815* (2013.01); *G06T 19/006* (2013.01)

(58) Field of Classification Search
CPC ......... G06T 7/73; G06T 19/006; G01S 19/25; G02B 27/017; G06F 3/04815
(Continued)

(56) References Cited

PUBLICATIONS

Azimi, Ehsan, et al. "Alignment of the virtual scene to the tracking space of a mixed reality head-mounted display." arXiv preprint arXiv:1703.05834 (2017). (Year: 2017).*
(Continued)

*Primary Examiner* — Jonathan S Lee
(74) *Attorney, Agent, or Firm* — Workman Nydegger

(57) ABSTRACT

Techniques and systems are provided for positioning mixed-reality devices within mixed-reality environments. The devices, which are configured to perform inside out tracking, transition between position tracking states in mixed-reality environments and utilize positional information from other inside out tracking devices that share the mixed-reality environments to identify/update positioning of the devices when they become disoriented within the environments and without requiring an extensive or full scan and comparison/matching of feature points that are detectable by the devices with mapped feature points of the maps associated with the mixed-reality environments. Such techniques can conserve processing and power consumption that would be required when performing a full or extensive scan and comparison of matching feature points. Such techniques can also enhance the accuracy and speed of positioning mixed-reality devices.

20 Claims, 12 Drawing Sheets

(51) Int. Cl.
  *G02B 27/01* (2006.01)
  *G06F 3/04815* (2022.01)
  *G06T 19/00* (2011.01)

(58) Field of Classification Search
  USPC .......................................................... 382/100
  See application file for complete search history.

(56) References Cited

PUBLICATIONS

Jing, Allison, et al. "Eyemr-vis: a mixed reality system to visualise bi-directional gaze behavioural cues between remote collaborators." Extended Abstracts of the 2021 CHI Conference on Human Factors in Computing Systems. 2021. (Year: 2021).*
Office Action Received for European Application No. 22729879.1, mailed on Jan. 9, 2024, 3 pages.

* cited by examiner

MIXED-REALITY DEVICE POSITIONING BASED ON SHARED LOCATION

CROSS-REFERENCE TO RELATED APPLICATIONS

This application is a continuation of U.S. patent application Ser. No. 17/333,431 filed on May 28, 2021, entitled "MIXED-REALITY DEVICE POSITIONING BASED ON SHARED LOCATION," and which application is expressly incorporated herein by reference in its entirety.

BACKGROUND

Mixed-reality (MR) systems, including virtual-reality (VR) and augmented-reality (AR) systems, have received significant attention because of their ability to create truly unique experiences for their users.

For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment, such that the user can only see virtual imagery rendered by their VR device. Some VR devices, however, are also configured to render actual or replicated passthrough images of the real word to their users, concurrently with their generated virtual imagery, such that the users may feel as though they are viewing the real world through their VR devices, along with the VR generated imagery.

In contrast, conventional AR systems create an augmented-reality experience by visually presenting virtual objects, referred to as holograms, to users within the users' actual view of the real world. The AR holograms can be projected to the users, for example, on specialized lenses that render the hologram imagery while the users concurrently look through the lenses to see the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

Sometimes, a plurality of HMDs and/or other mixed-reality devices are used concurrently and cooperatively within a shared mixed-reality environment to facilitate collaborative work, entertainment, and other joint activities. Whether these devices are used alone, or in combination, it is critically important for the mixed-reality devices to continually track their relative locations within the mixed-reality environments, so that the holograms and other virtual imagery is positioned properly for the users within the mixed-reality environment. Unfortunately, it can sometimes be difficult for mixed-reality devices to properly identify their positions within the environments they are being used. This may occur, for example, due to interference, processing glitches, poor visibility, motion irregularities, and so on.

Some devices, referred to inside out tracking devices use internal camera sensors to capture images of the real world to identify the real-world environment where they are located, as well as the relative location of the devices within that real world environment. These cameras may include, for example, traditional cameras, low light cameras, thermal imaging cameras, UV cameras and other cameras that are capable of detecting different features within the environment.

Even more particularly, camera sensors are used by the systems to capture images of the environment that can be used to generate depth maps of the environment to assess the relative position of the devices within the environment by correlating calculated depths of the device from detected feature points with the known markers, anchors, feature points and other location landmarks of the known and mapped environment. However, due to poor visibility or other imaging conditions, such as a lack of textured surfaces or edges having unique feature points, it can sometimes be difficult for inside out tracking devices to map new environments and/or to identify their relative locations with known mapped environments.

Some devices also rely on other sensors, such as GPS (Global Positioning System) sensors to obtain location information from dedicated positioning systems in communication with the devices, to determine the devices' locations within the real world. However, poor communications with the dedicated positioning systems, due to network connectivity problems and/or interference, can sometimes prevent these types of devices from calculating or updating their positions based on GPS data.

Some devices may also use motion sensors, such as gravitometers, accelerometers and gyroscopes to estimate relative movement from a first known position to a new estimated position based on movement of the devices. However, jarring movements of the devices can prevent the devices from estimating their positions accurately, as the devices sometimes have difficulty assessing relative changes in position in response to such extreme changes in momentum. Additionally, even without extreme movements, some devices can still have difficulty determining and updating their positions accurately due to irregularities and inconsistencies in the monitored sensor data, particularly since even the smallest errors in estimation can become magnified during the iterative interpolations required to estimate positioning with such sensor data.

It will be appreciated that when mixed-reality devices are incapable of properly identifying their positioning within the real world, the resulting experience for the user can be very unsatisfactory, as the holograms and other virtual imagery of the generated virtual environment will not be properly aligned with the real-world environment. These problems are made even worse when the user is using multiple devices, such as peripheral devices to interact with virtual objects, particularly when these peripheral devices have estimated locations and orientations that are not co-aligned or positioned with the relative positioning that is determined for the HMD and/or other mixed-reality devices that image the mixed-reality environment. In these circumstances, the resulting interactions of the peripheral devices the with virtual objects will be inconsistent with the intended and expected results for the users that are immersed within the mixed-reality environments.

The problems associated with inconsistencies and inaccuracies in positioning mixed-reality devices are particularly evident when multiple different users are each using different devices within shared mixed-reality environments. Without proper positioning, it can be difficult to facilitate the desired collaborative work, entertainment, and other activities that rely on coordinated positioning.

When devices become disoriented or otherwise lose track of their specific positioning within a particular environment, the devices expend significant computational and power resources to reposition themselves within the environments. This expense may include, for example, generating and/or accessing the depth maps for the environments and identifying and matching imaged feature points with all potential matching sets of feature points in the associated map. When the map is very large, e.g., multiple Gigabytes, there may be several potential matching locations where the device could be positioned within the identified map(s). It takes significant processing to narrow the feature sets down to a particular location that is most certain. This processing is also a significant drain on battery power.

Accordingly, there is an ongoing need and desire for improving positioning of devices within the real world, particularly for mixed-reality devices. The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Systems, devices, and methods are configured for positioning mixed-reality devices in shared mixed-reality environments.

Some mixed-reality devices are configured to perform inside out tracking and to perform positional tracking of the devices within the mixed-reality environments while transitioning between different position tracking states associated with different probabilities of positional certainty or accuracy. The devices are configured to utilize positional information from other inside out tracking devices that share the mixed-reality environments and to identify/update the positioning of the devices when they become disoriented within the environments and without requiring an extensive or full scan and comparison/matching of feature points that are detectable by the devices with mapped feature points of the maps associated with the mixed-reality environments. While not required, such techniques can conserve processing and power consumption that would otherwise be required when performing a full or extensive scan and comparison of matching feature points. Such techniques, while also not required, can also be used to enhance the accuracy and speed of positioning mixed-reality devices in shared mixed-reality environments.

Some disclosed devices include mixed-reality devices that are configured to determine positioning based on sensor data (e.g., image data) captured by the devices. Such devices include one or more processors and one or more camera sensors configured to image data within the environments where the devices are located. Such devices also include one or more computer-readable hardware storage devices that store instructions that are executable by the one or more processors to configure the devices to determine positioning of the device within the environment based at least in part based on positioning information obtained from a separate inside out tracking device within the same environments and that share common mixed-reality maps with the device(s).

The methods implemented by the devices include a method for positioning the devices that includes identifying a mixed-reality map corresponding with the environment, performing position tracking of the device within the environment, while in a first tracking state, to identify a relative position of the device within the mixed-reality map as the device moves within the environment in a first tracking state, and to detect an event associated with an interruption of the position tracking of the device during which the device transitions from a first tracking state to a second tracking state that is less certain than the first tracking state and that causes a reduced certainty of the relative position of the device within the environment and corresponding mixed-reality map.

Some disclosed methods also include obtaining positioning information from the separate inside out tracking device in the environment, the positioning information from the separate inside out tracking device identifying a relative position of the separate inside out tracking device inside of a sub-region of the mixed-reality map and that also indicates the device is within a same sub-region of the mixed-reality map as the separate inside out tracking device. Some methods also include obtaining one or more images with the one or more camera sensors and identifying one or more imaged features in the environment from the one or more images, as well as searching a particular sub-region of the mixed-reality map for a matching set of one or more matching features that match the one or more imaged features and while refraining searching other sub-regions of the mixed-reality map for the matching set of one more matching features and in a manner that conserves computational expense that would otherwise be associated with searching the other sub-regions of the mixed-reality map for the one or more matching features.

Finally, these methods also include determining a new position of the device within the sub-regions of the mixed-reality map based on finding the matching set of one or more matching features in the sub-region of the mixed-reality map and based on correlating a relative position of the device from the one or more imaged features and corresponding one or more matching features in the sub-region and resuming position tracking of the device based on the determined new position of the device.

Other methods additionally, or alternatively, include using the position information from the separate inside out tracking device and a known or estimated relative position of the device relative to the separate inside out tracking device to determine a new position of the device in the second tracking state and while by conserving resources by refraining from analyzing different portions of the mixed-reality map to identify a most likely location of the device within the mixed-reality map based on sensor data obtained by the device independently of the separate inside out tracking device.

Yet other methods additionally, or alternatively, include determining a probability valuation associated with probability that the device is within the sub-region of the mixed-reality map based on the searching and receiving position information from a second device comprising a separate probability valuation that the second device, which is a separate inside out tracking device, is within a particular location of the mixed-reality map, as well as determining a new position of the device within the mixed-reality map based on the position information from the second device and the probability valuation of the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As mentioned above, disclosed embodiments include systems, devices and methods configured for positioning mixed-reality devices in shared mixed-reality environments.

The mixed-reality devices are configured to perform inside out tracking and to perform positional tracking of the devices within mixed-reality environments while transitioning between different position tracking states associated with different probabilities of positional certainty or accuracy, such as, for example, due to various environmental conditions that affect the ability of the devices to obtain, verify or process sensor and location data.

As disclosed herein, when a device becomes disoriented and transitions from a state of positional certainty to a state of positional uncertainty, the device is configured to utilize positional information from other inside out tracking devices that share the same mixed-reality environment with the disoriented device and to identify/update its positioning based on this information without requiring an extensive or full scan of a mapped environment and comparison of feature points that are detectable by the devices with mapped feature points of the maps associated with the mixed-reality environment.

It will be appreciated that the technical benefits associated with the disclosed embodiments include the ability to conserve processing and power consumption that would otherwise be required when performing a full or extensive scan and comparison of matching feature points. Disclosed techniques can also be used to enhance the accuracy and speed of positioning mixed-reality devices in shared mixed-reality environments.

Example MR Systems and HMDs

Figure 1:
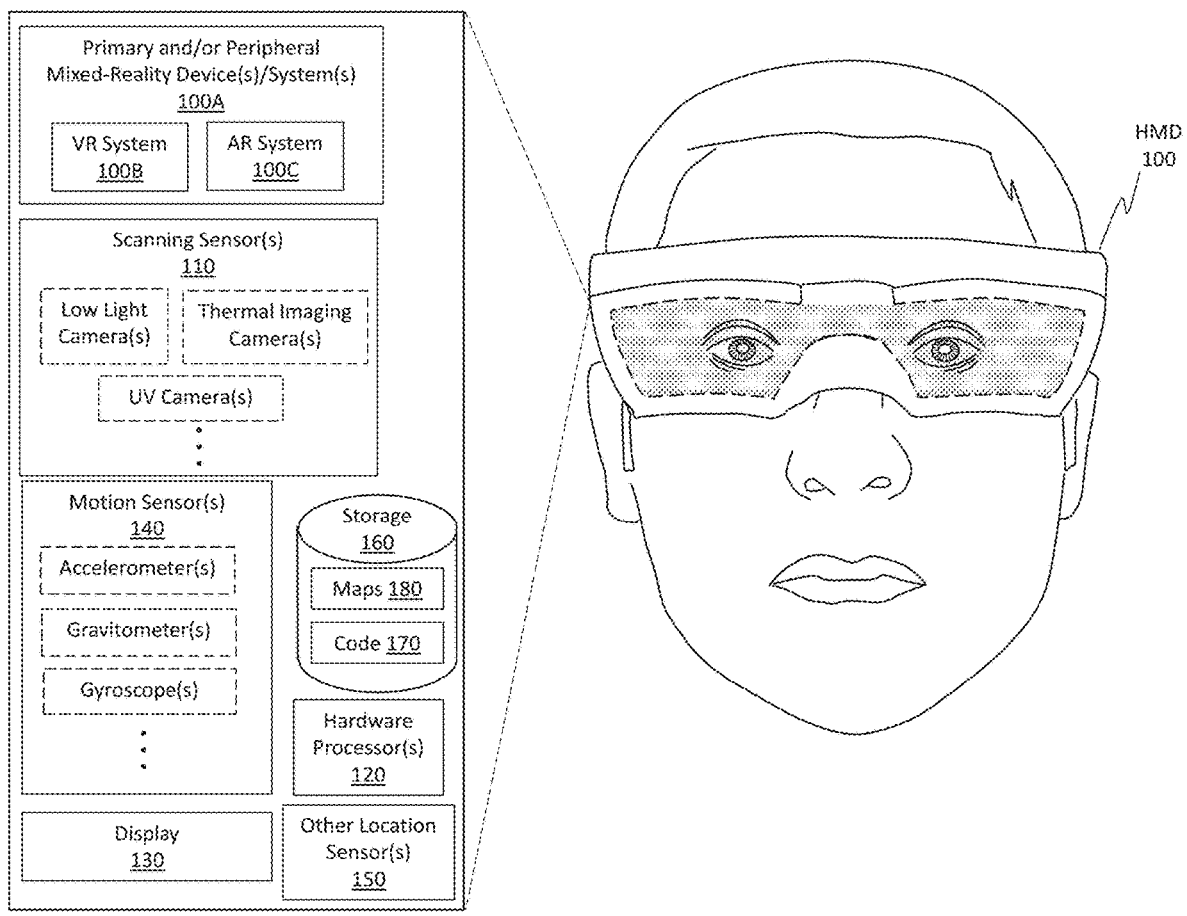
FIG. 1 illustrates an example mixed-reality device, which is illustrated as a Head Mounted Device (HMD).

Attention will now be directed to FIG. 1, which illustrates an example of a mixed-reality (MR) system/device 100A comprising a head-mounted device (HMD) 100. It will be appreciated that HMD 100 can be any type of MR system/device 100A, including a VR system 100B or an AR system 100C.

The mixed-reality system(s) 100A, as described herein, include primary devices that render the mixed-reality environment to the users, as well as peripheral devices that comprise controllers for interacting with the virtual objects in the shared/common mixed-reality environment and application instances.

In some scenarios, such as when multiple HMDs are used in a shared mixed-reality environment and application instance, one HMD may be referred to as a first or primary device and the other HMDs may be referred to as a secondary or peripheral device.

It should be noted that while a substantial portion of this disclosure is focused on the use of an HMD and corresponding peripheral devices (e.g., controllers) used in coordination with an HMD, the embodiments are not limited to being practiced using only an HMD systems. That is, any type of scanning and imaging system can be used, even systems entirely removed or separate from an HMD to perform the functionality described herein. Accordingly, the disclosed principles should be interpreted broadly to encompass any type of mixed-reality devices. Some embodiments may even refrain from actively using a scanning/imaging device themselves and may simply use the data generated by a shared scanning/imaging device. For instance, some embodiments may at least be partially practiced in a cloud computing environment where resources and components are shared. HMD 100 is currently shown as including scanning sensor(s) 110 (i.e., a type of scanning or camera system, such as one or more visible light camera(s), low light camera(s), thermal imaging camera(s), potentially ultraviolet (UV) camera(s), and dot illuminator(s) or other cameras), which include corresponding processors for processing the captured images.

The HMD 100 is configured to use the scanning sensor(s) 110 and corresponding processor(s) 120 to scan environments, map environments, capture environmental data, detect features in the environment, determine depth from detected features in the environment, generate pose data, and/or generate any kind of images of the environment (e.g., by generating a 3D representation of the environment).

Scanning sensor(s) 110 may comprise any number or any type of scanning devices, without limit.

Accordingly, the disclosed embodiments may be structured to utilize numerous different camera types. The different camera types include, but are not limited to, visible light cameras, low light cameras, thermal imaging cameras, and UV cameras. Stereo depth matching may be performed using images generated from any one type or combination of types of the above listed camera types. Images or image content generated by the scanning sensor(s) 110 may then be displayed on the display 110 of the HMD 100 for the user to view and interact with, along with one more virtual objects rendered by the mixed-reality device(s) within the same shared environment(s) on the display(s) 130 of the device(s).

Motion sensor(s) 140, such as accelerometers, gravitometers, gyroscopes, and other motion sensors 140 (e.g., IMU (inertial movement unit) devices) and corresponding processor(s) 120 detect and measure sensor data (e.g., IMU data) reflecting detected motion of the device and to estimate and interpolate positioning of devices based on the measured motion relative to the previously known position(s) of the device.

Other sensors 150, such as global positioning system (GPS) sensors, magnetometers, acoustic sensors, and other sensors are also provided with corresponding processor(s) 120 for enabling the mixed-reality devices to determine positioning of the devices. This positioning may include measured and estimated location and/or orientation positioning information relative to a measured sensor data, relative positioning to other objects and features in a known/shared environment, and/or based pm a previously known positioning information of the device.

The illustrated mixed-reality device(s) 100A also include storage 160, which stores executable instructions (e.g., code 170) that is executable by the hardware processor(s) 120 to implement the disclosed functionality. The storage also stores maps 180 of the mixed-reality environment that are described herein, as well as any of the other data that is referenced herein, such as sensor data, applications, interfaces, and objects used to render and utilize the disclosed mixed-reality environment.

Although not explicitly shown, the mixed-reality devices also include various communication interfaces and components for interfacing with and sharing information (e.g., maps and location information) between different mixed-reality devices and remote systems.

Figure 2:
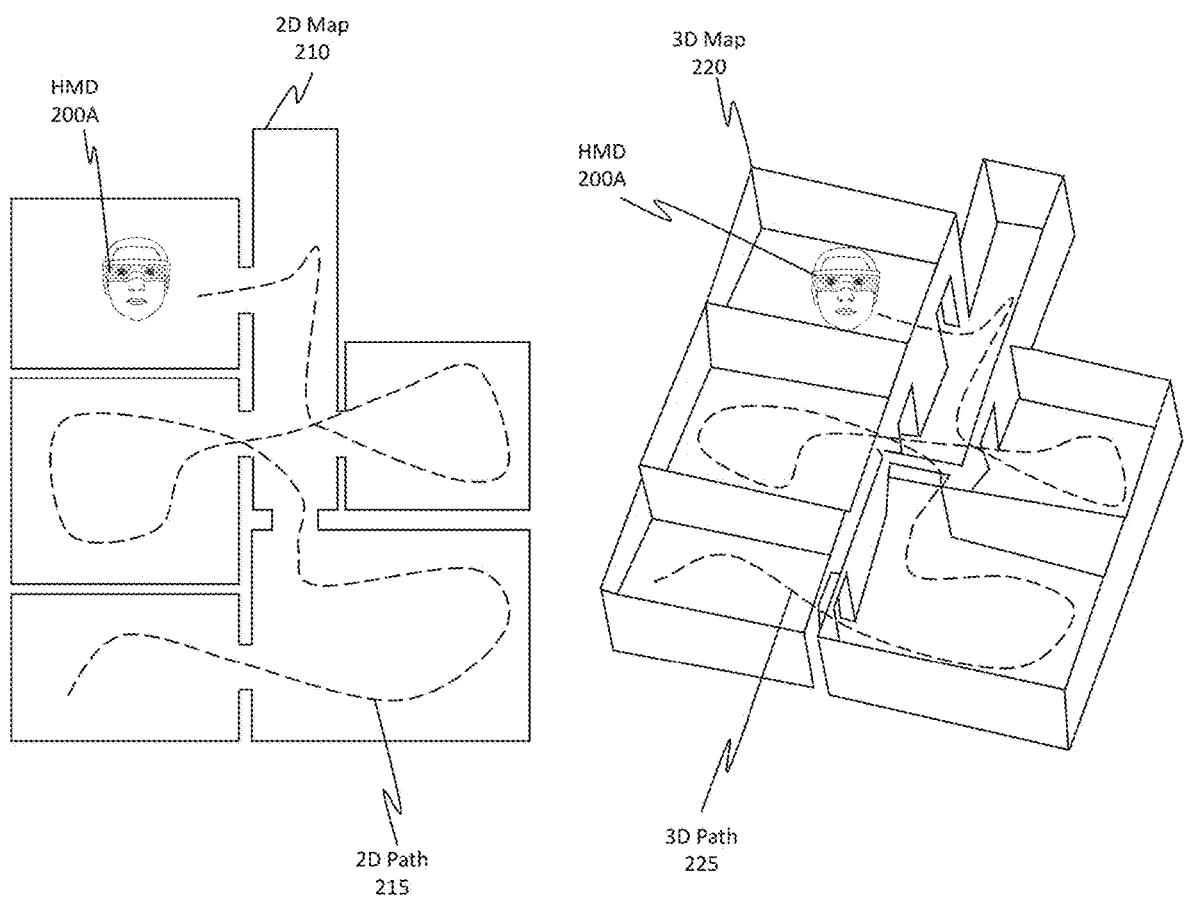
FIG. 2 illustrates various example use cases in which a mixed-reality device may be used to navigate through an environment and mixed-reality environment.

Attention will now be directed to FIG. 2, which illustrates a 2D map 210 and a 3D map 220 through which a user is navigating a corresponding path, respectively, 215 and 225. The maps 210/220 are mixed-reality maps that are used during the execution of a mixed-reality application to render holograms and other virtual content to a user wearing a mixed-reality device (e.g., HMD 200A) in a mixed-reality environment. The term mixed reality environment refers to any combination of virtual content with real world content and a real-world environment. In some instances, the term mixed-reality environment corresponds with a separate mixed-reality map of a real or virtual environment and features in the environment that can be virtualized relative to corresponding or different features in a real-world environment. It some instances, the term mixed-reality environment is used interchangeably with the corresponding mixed-reality map that contains any combination of real and/or virtual objects and features that are mapped with relative positions to other mapped/known objects within the mixed-reality environment/map.

With regard to the 2D and 3D maps 210 and 220, it will be appreciated that the devices disclosed herein may generate the maps by capturing and stitching together images from the sensors/cameras of the devices as the devices navigate a path (e.g., 215/225) through an environment. These maps may be supplemented with virtual content and/or they may be virtualized to render the mixed-reality environment corresponding with the maps to the users of the MR devices. Alternatively, or additionally, the devices may access and download maps of an environment, which are used in the mixed-reality applications. The mixed-reality maps may render borders/walls that exist or that do not really exist in the real world, but which are rendered in the mixed-reality environment along with other virtual objects/holograms.

As mentioned previously, it is critical that the mixed-reality devices are positioned properly within the mixed reality environment where they operate, particularly as they are moved around in a mixed-reality environment, irrespective of whether the real world has corresponding borders/walls or other features. Otherwise, the virtual objects of the mixed-reality environment will not be properly aligned with their intended positioning relative to the user and/or real world environment and this can result in unexpected and undesired consequences (e.g., interactions with virtual objects are not executed or executed in unexpected ways, users can become disoriented within a virtual map and/or collide with objects in the real worlds while navigating/traversing a path through the mixed-reality environment, and so forth).

During use, the mixed-reality devices and/or any remote servers they communicate with may continuously monitor and update the location of the MR devices relative to the map and mapped features of the mixed-reality environment (and corresponding real world), to ensure all virtual objects are properly positioned relative to the user/devices and real-world objects within the mixed-reality environments in the intended manner.

To enhance the user experience, the positioning of the device may occur multiple times a second so that updated positioning appears smooth and as expected while the user moves within a mixed-reality environment. However, sometimes, the sensor devices used to perform positioning of the devices becomes unavailable. For instance, a GPS sensor may become unusable when the device moves into a satellite obstructed or other GPS denied environment where the sensor is unable to communicate with the GPS satellites/systems. Likewise, imaging sensors may become unusable for identifying environmental features to position the device within the environment when lighting becomes too dark or objects in the environment are obscured. Additionally, certain surfaces and environments may not include many edges, objects or other unique features that are easy to detect with the imaging sensors.

Figure 3:
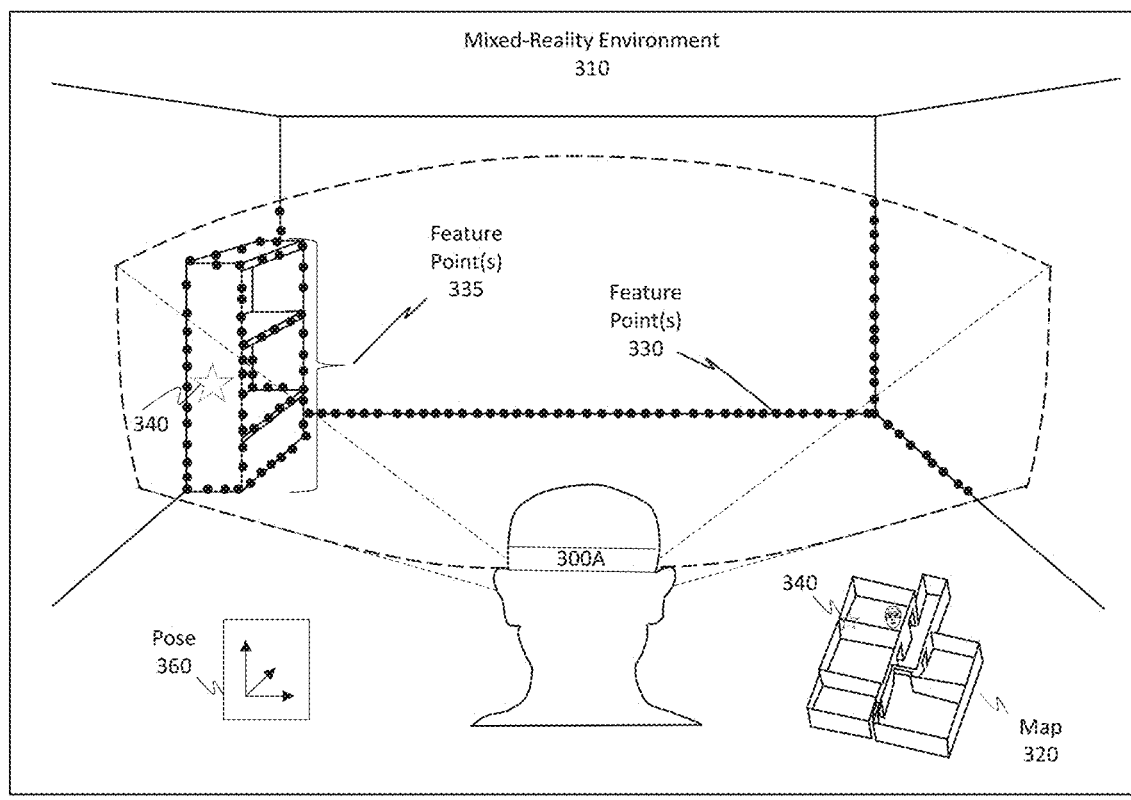
FIG. 3 illustrates a use scenario in which a mixed-reality device identifies feature points in the mixed-reality environment where it is being used.

FIG. 3, for example, shows an environment 310 in which a device is scanning a room that is part of a mapped mixed-reality environment and a corresponding mixed-reality map 320. During use, the device 300A uses cameras to scan/image the environment to identify features or feature points that are detectable with the device cameras/sensors to position the device. In the present illustration, various feature points 330, shown as dark dots, are detected by the device. Many of these feature points 330, such as the feature points 330 positioned between the walls and the floor, however, are not unique and could correspond to almost any room (sub-region) of the map 320, as well as to different locations in each room. In this regard, these feature points 330 may not be usable to position the device within the map unless the device was already generally aware of where it was.

When a device becomes disoriented, due to various positioning process glitches and/or interruptions in the processing routines, existing devices will attempt to correlate the detected feature set with all matching feature sets in the map to determine the relative position (e.g., location of the device within the map 320, as well as the relative orientation/pose 360 of the device). This exhaustive processing is computationally expensive and can undesirably consume scarce battery power.

When the detected set of features include unique feature points, such as the feature points 335 of the shelf 340, it may make the resulting correlation/matching of detected feature points with the mapped feature points of the map 320 more certain. However, it does not always make it more efficient, particularly if the system still performs a full comparison of the feature sets against all possible options in the entire map 320.

Existing systems and devices can help mitigate such consequences by relying on supplemental information from another device in the same shared mixed-reality environment, as described herein.

Figure 4:
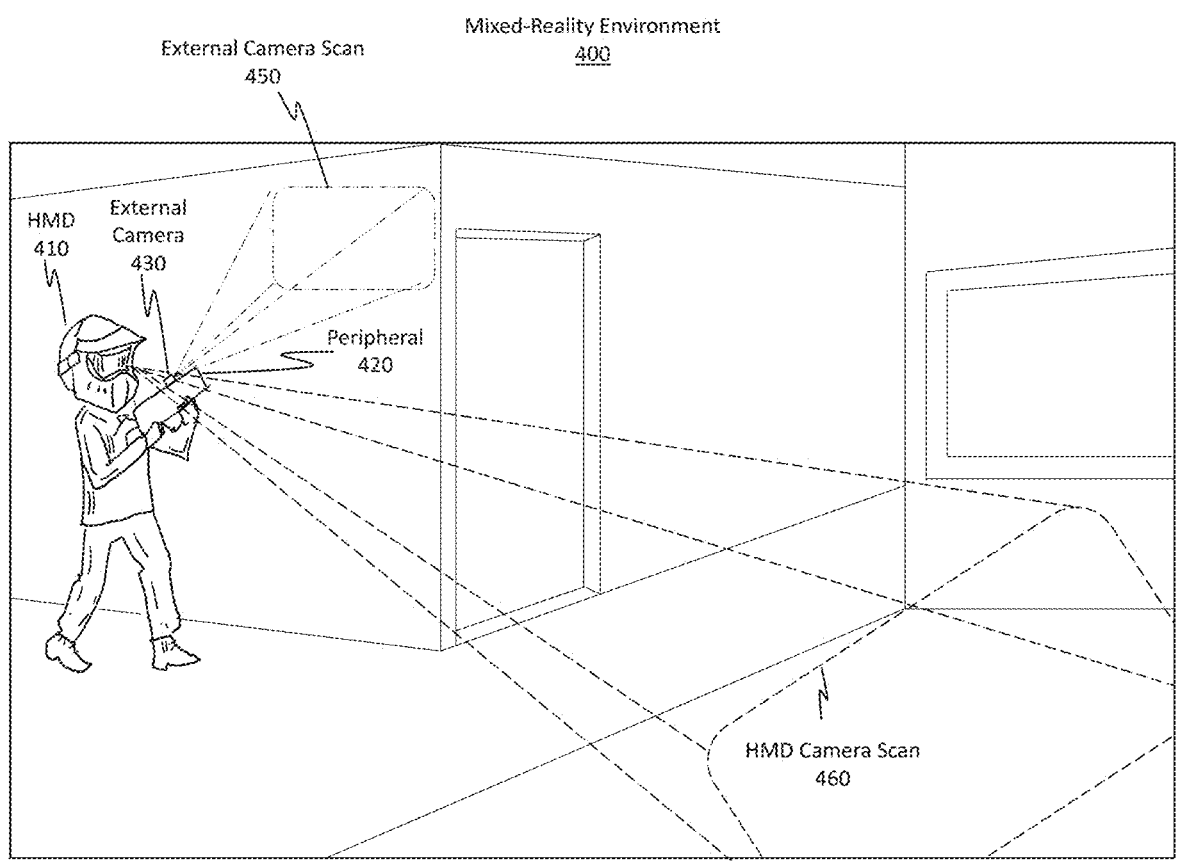
FIG. 4 illustrates a gaming environment in which mixed-reality devices are being used.

Attention is now directed to FIG. 4, which illustrates a mixed-reality environment 400 in which a user is wearing an HMD 410 and carrying a separate peripheral device 420 comprising a controller that operates as a painting device (e.g., for painting holograms) or as a capture device (e.g., for capturing holograms) in a virtual game. Both of the HMD and peripheral devices are separately scanning the environment to position and update the positioning of the devices within the environment properly. In particular, the HMD is using camera sensors (not shown) to make one or more camera scans 460 of the environment and to identify features in the environment that can be correlated with corresponding features in a mixed-reality map to position the HMD 410 within the mixed reality environment. Likewise, the peripheral mixed-reality device 420 is making external camera scans 450 with its external camera(s) 430 to identify its relative location within the environment 400.

Sometimes, as mentioned, one of the devices may lose its bearing and become disoriented within the mixed-reality environment for any number of reasons. In such circumstances, either one of the mixed-reality devices (which share the common mixed-reality environment) may utilize information from the other device (e.g., the HMD 410 or the Peripheral 420) to help ascertain its position within the mixed-reality environment and to help limit the range (e.g., sub-regions) of the mixed-reality map that must be evaluated when considering where the disoriented device is actually positioned within the mixed-reality map/environment.

Figure 5:
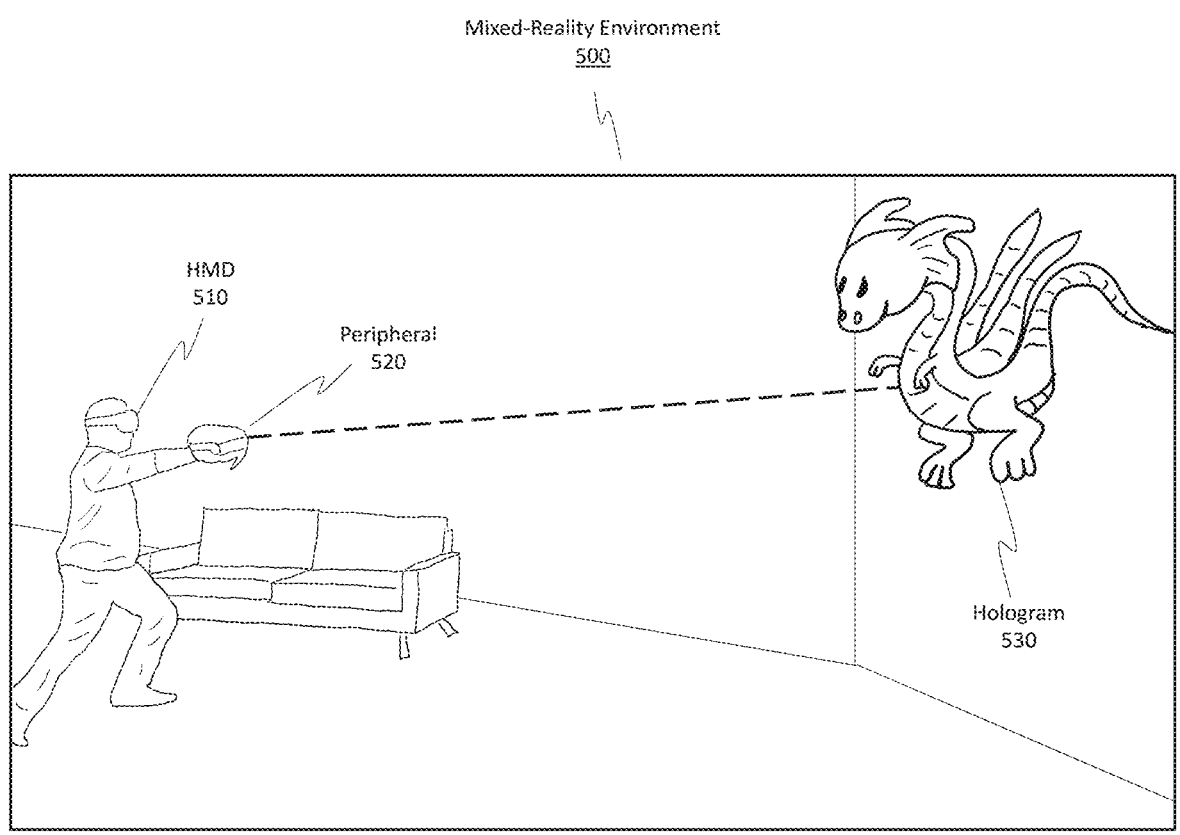
FIG. 5 illustrates another gaming environment in which mixed-reality devices are being used.

Attention is now directed to FIG. 5, which illustrates another mixed-reality environment 500 in which a user is wearing an HMD 510 and carrying a separate peripheral device 520, comprising a controller for interacting with a hologram 530 in the mixed-reality environment 500. Both of the HMD and peripheral devices are separately scanning the environment to position and update the positioning of the devices within the environment properly, as previously described. In such instances, it is critical that the devices are both properly positioned within the environment 500. Otherwise, it may prevent the user from seeing and/or interacting with the hologram 530 in a desired and expected manner.

Figure 6:
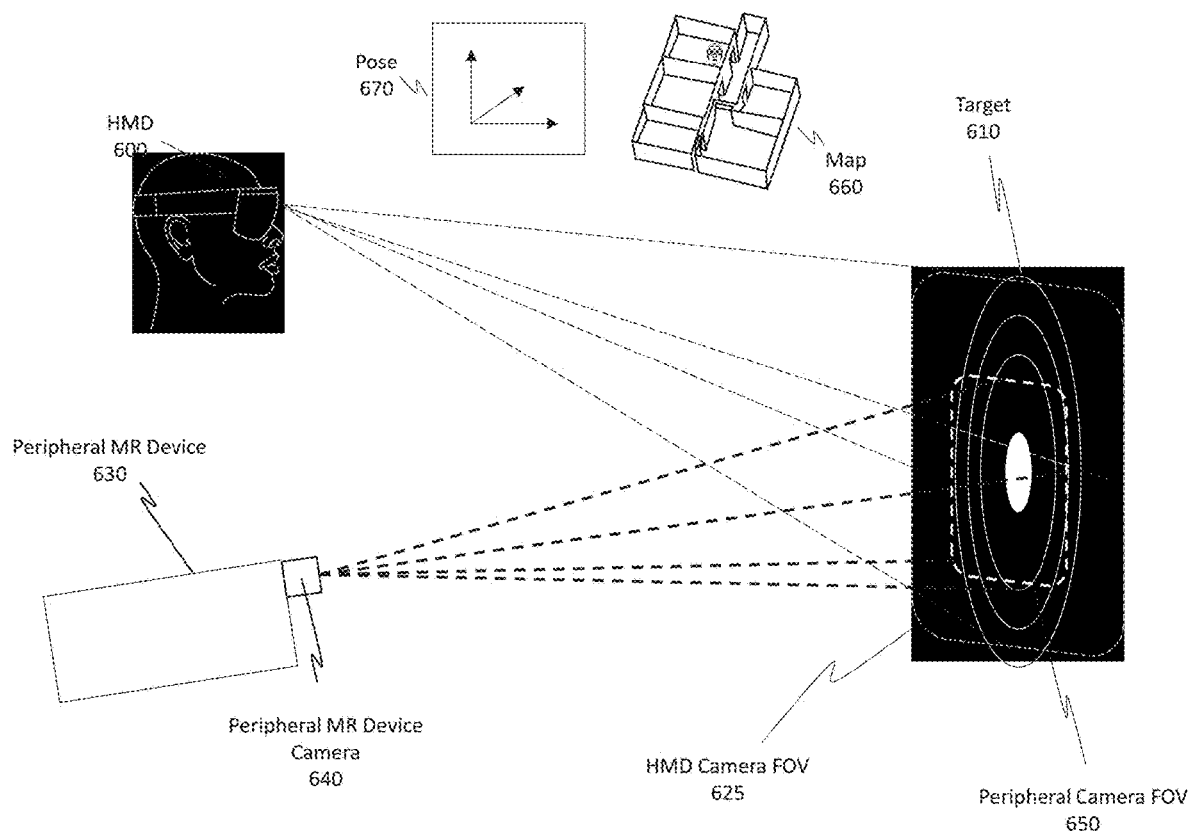
FIG. 6 illustrates how separate mixed-reality devices can be used in a cooperative manner with a shared mixed-reality environment.

This is even more evident from the illustrations shown in FIG. 6. In this example, an HMD 600 is projecting a hologram target 610 to a user within the user's/HMD field of view 650 of the mixed-reality environment. The target 610 may be rendered on a display of the HMD, for example, corresponding directly with the determined positioning of the HMD within the environment. This target 610 may be an isolated hologram that is untethered to a real-world object, such as the dragon hologram 530. This target 610 may also be displayed on one or more real world objects, such as a wall or a user (e.g., such as in the multiplayer scenario of FIG. 9). Accordingly, it is important the HMD 600 is properly positioned within a corresponding mixed-reality environment and corresponding map 660, which may correspond to and be aligned with either fixed or moving real world objects in the mixed reality environment.

Likewise, the user's peripheral controller (Peripheral MR Device 630), comprising a controller for controlling or interacting with the target 610 (e.g., the hologram 530 of FIG. 5) must also be properly positioned within the environment that the HMD is located within. Otherwise, the peripheral controller will not be aligned with the target, which has a field of view 650 and alignment with the target in the current position, based on the HMD positioning (location in the mapped environment and orientation/pose 670), and it may not operate as intended when interacting with the hologram 530/target 610.

As described herein, if either of the devices loses its positioning within the environment, such as if the peripheral MR device camera 640 is not working or imaging properly, the peripheral MR device 630 may rely on information from the HMD to help position the peripheral MR device 630 within the mixed-reality environment by evaluating only a sub-region of the mapped environment and without requiring the imaging/scanning of an entire map of the mixed-reality environment to ascertain its position based on matching feature points or other corresponding features.

Figure 7:
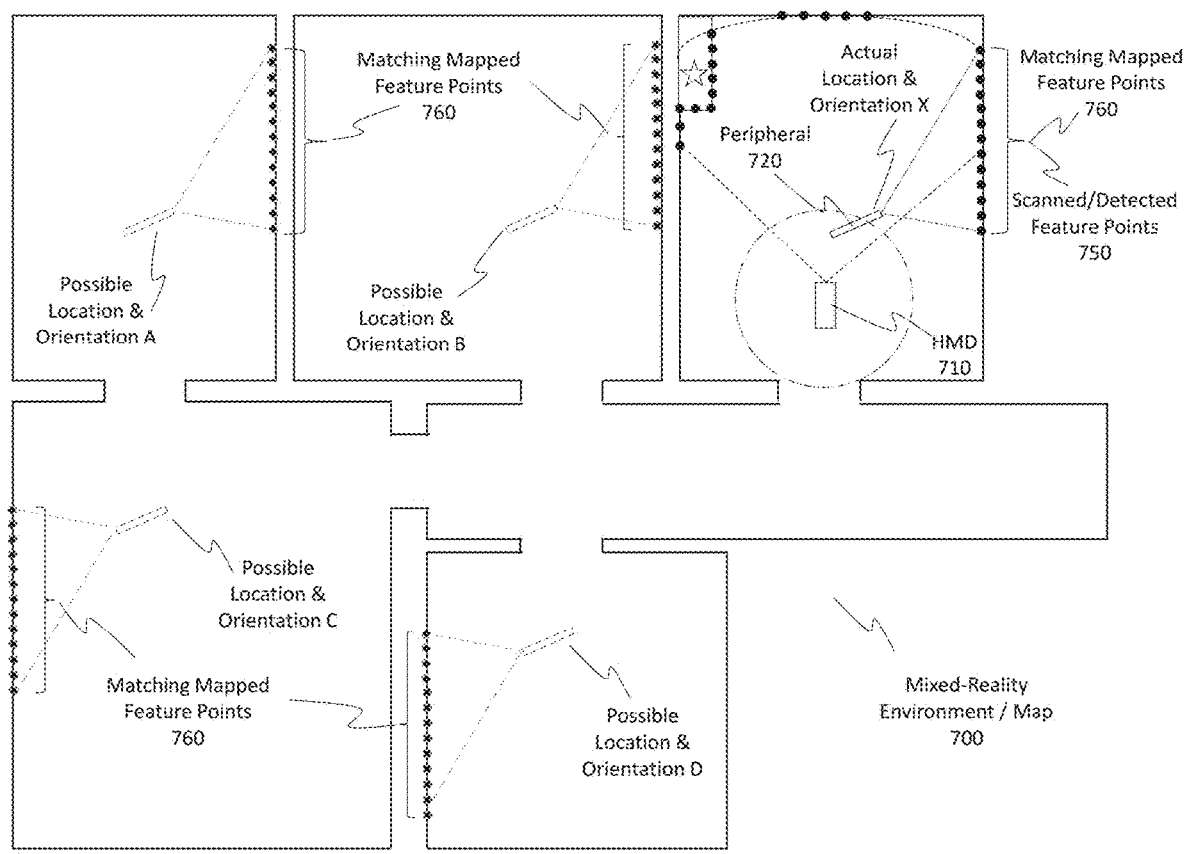
FIG. 7 illustrates various example use cases in which a mixed-reality device may be positioned relative to feature points that are identified by the mixed-reality device and that may match corresponding feature points in different sub-regions of a mixed-reality map.

Attention will now be directed to FIG. 7, which illustrates a mixed-reality environment/map 700 comprising a 2D map in which a user is wearing an HMD 710 and holding a peripheral 720. The user and user's MR devices are positioned in a particular sub-region of the map, namely, a particular room of the multi-room map.

Both of the MR devices (HMD 710 and peripheral 720) are inside out tracking/positioning devices, meaning that they both have independent sensors (e.g., cameras) for scanning the environment and are independently capable of finding feature points or other features within the scanned imagery and to correlate the scanned/detected feature points 750 with one or more sets of matching mapped feature points 760 of the mapped environment, which feature points include matching mapped feature points 760 (as shown in the upper right corner of the image) and which align directly with the scanned/detected feature points 750.

If the peripheral device loses its positioning in the mixed-reality environment/map 700, it may scan the scanned/detected feature points 750 in its current location and try to determine where it is in the mixed-reality environment/map 700. To do this, it may compare the scanned/detected feature points 750 to all sets of matching mapped feature points 760 throughout the mapped environment that correspond to possible locations & orientations of the peripheral 720 (namely possible location and orientations A, B, C, D, as well as actual location & orientation X). It may track all these possible locations until it receives/detects additional information that narrows the scope of possible locations. The processing to evaluate and track each of these possible locations is computationally expensive and can be made more efficient by relying on positioning information from the HMD 710 that is sharing the same mixed-reality environment, and which has a known proximity to the peripheral 720.

By way of example, the HMD can be known to be within a fixed radius/distance from the peripheral, based on known use patterns and settings associated with the devices. The HMD may also have uninterrupted tracking and/or have more certainty about its positioning based on additional feature points that it is able to scan and that are unique. If the HMD knows its general location (e.g., a particular sub-region of the mixed-reality environment/map 700), it can notify the peripheral device in either a push or pull scheme so that the peripheral device may be aware it is in a generally similar portion of the mixed-reality environment/map 700 (e.g., a particular sub-region of the map). In this instance, the sub-region may be a particular room wing, branch, or other identifiable region of a map. Then, the peripheral need not evaluate and compare the matching mapped feature points to all matching mapped feature points in the mapped environment. Instead, it may limit its analysis to only the sub-region where the HMD 710 is located, based on the shared position information from the HMD 710, and so as to refrain from considering the matching mapped feature points 760 in all of the other sub-regions of the mapped environment, thus saving computational processing and power resources. In such embodiments a device may evaluate a sub-region of a map containing relatively little data (<10, 20, 30, 40, 50, 60, 70, 80, 90, 100 MB of data), for example, and without having to evaluate an entire map or multiple sub-regions of a map that contain relatively more data (>100+MB of data, or even many GB of data).

Figure 8:
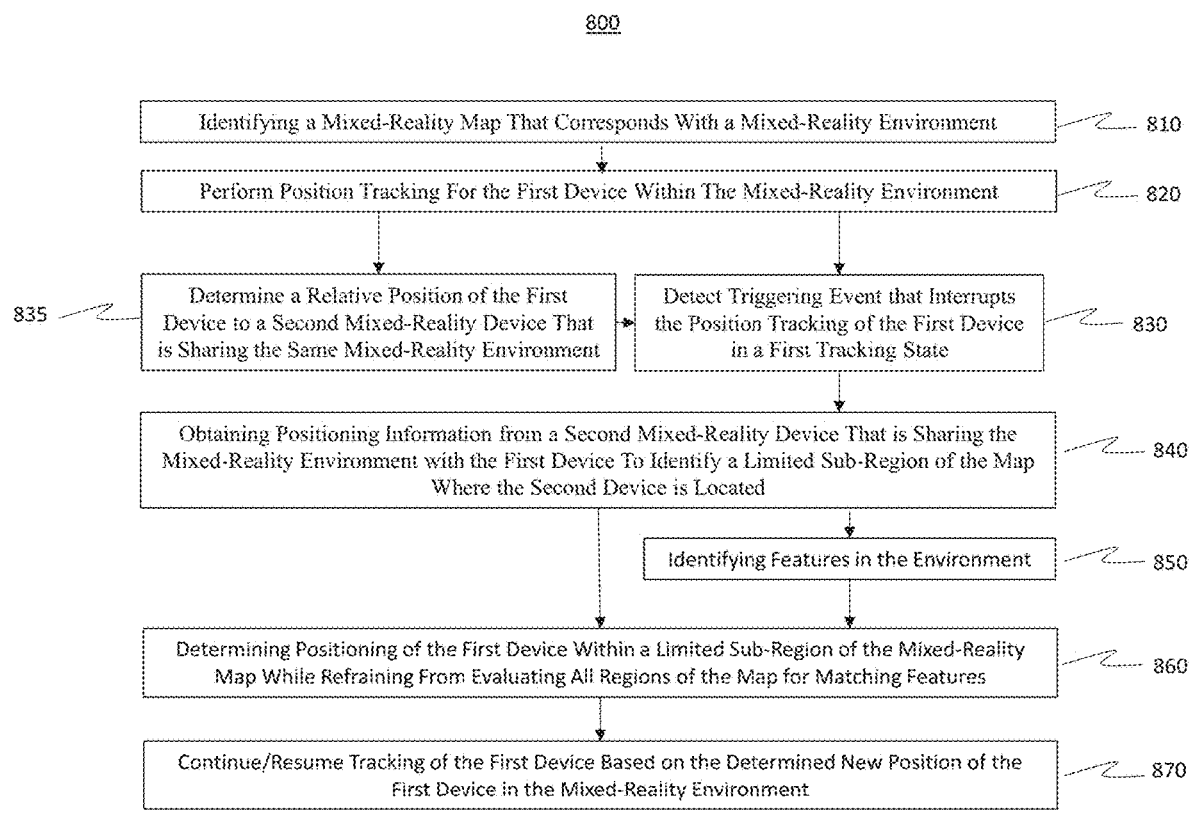
FIG. 8 illustrates a flow diagram with various acts associated with positioning mixed-reality devices.

These principals are further reflected in the flow diagram 800 of FIG. 8, which illustrates various acts associated with positioning a mixed-reality device within a mixed-reality environment based on positioning information from another mixed-reality device that shares the same mixed-reality environment/map, and which may be implemented by the disclosed systems and devices described herein. As described below, the various acts can be performed by a single MR device (also referred to as system). Additionally, or alternatively, the acts can be performed by and/or controlled by a server that causes one or more of the acts to be performed by instructions sent from the server to the referenced first and/or second devices.

As illustrated, the first act is an act of identifying a mixed-reality map corresponding with the environment (act 810). This act may be performed by a first MR device generating a map from scanned images, by updating a stored map with newly scanned images, or appending a map with scanned images, wherein the images are obtained by the first MR device or from a remote device. This act may also be performed by accessing and downloading a map from a remote device, such as a remote server or third-party device and/or from a device that is sharing the mixed-reality environment/map with the first MR device.

Next, the first device performs position tracking of its location and/or orientation of the first device within a mixed-reality environment/map, based on detected sensor data of the first device and while performing the position tracking in a first position tracking state (act 820). This first state is a state of high confidence or probability of accuracy. This first state may be based on supplemental information from third party sensors such as GPS sensors and it may also be based alternatively, or additionally, based on motion sensor data detected by the first device. The positioning or position tracking is performed while the device exists and/or moves within the mixed-reality environment in the first tracking state.

Then, at some point, a triggering event is detected (act 830) that is associated with an interruption of the position tracking of the device and/or a transition of the device from the first tracking state (with high confidence of probable accuracy) to a second tracking state (of lower confidence of probable accuracy) and that has a lower probability of accuracy than the first tracking state and that causes a reduced certainty of the relative position of the device within the environment and corresponding mixed-reality map than when the device operated in the first tracking state.

In response, the device obtains positioning information from a separate/second MR tracking device (e.g., inside out tracking MR device) that is sharing the same mixed-reality environment and/or mixed-reality application instance as the first MR device (act 840). Notably, the positioning information from the separate/second device identifies a relative position of the separate/second device inside of a sub-region of the mixed-reality environment/map.

In some instances, the shared position information also indicates the first device is within a same sub-region of the mixed-reality environment/map as the separate/second device. Other position information can also be used to make this determination, such as previously obtained position information that reflects the first device is used/present within a predetermined position and/or maintains a relatively similar and close position to the second device during use (act 835). This other position information may specifically identify the relative location and/or orientation of the first device relative to the second device during normal use, which may be a predetermined relative position and/or orientation and or historically tracked use that is stored and reviewed by the device.

In some instances, the first device also obtains feature information for the environment 850, specifically the sub-region that has been identified. This may occur, for instance, by identifying features from a last known location in the mixed-reality map/environment and/or by scanning new images in the environment with camera sensors and identifying features in the images, such as feature points or known objects, using object recognition.

The device also searches the a particular sub-region of the mixed-reality map for a matching set of one or more matching features (e.g., feature points 335, 750, 330, others) or objects (e.g., shelf 340) that match the one or more imaged features or objects and while refraining searching other sub-regions of the mixed-reality map for the matching set of one more matching features or objects and in a manner that conserves computational expense that would otherwise be associated with searching the other sub-regions of the mixed-reality map for the one or more matching features or objects (act 860).

Then, the device determines a new position of the device within the sub-regions of the mixed-reality map based on finding the matching set of one or more matching features in the sub-region of the mixed-reality map and based on correlating a relative position of the device from the one or more imaged features and corresponding one or more matching features in the sub-region (act 870). At this point, the probable location and certainty of position of the device within the mixed-reality environment/map may be greater than the second tracking state probability and even the first tracking state probability and while conserving processing resources by not requiring (and actually refraining from performing) a full analysis of the entire mapped environment for matching features/objects that are identified by the device.

Using the new positioning of the device, the device may then resume position tracking of the device in the mixed-reality environment based on detecting new sensor data. It will be appreciated, in this regard, that the determined new positing and resumed position tracking may comprise any combination of location and/or orientation positioning of the device within the mixed-reality environment.

In some instances, the first device is a peripheral MR device that is a controller that shares the mixed-reality map and a corresponding mixed-reality application instance with an HMD (the second device), the controller being operable to interact with one or more interactive virtual objects rendered to a user through the HMD.

In other instances, the device first device is a first HMD worn by a first user and the separate/second device comprises a second HMD worn by a second user, the first and second HMDs rendering one or more common virtual objects in a shared application.

In some instances, the triggering event for transitioning from the first tracking state to the second tracking state is an occurrence of the first device entering a global positioning system (GPS) denied environment or sub-region (such that the GPS positioning is used in the first tracking state but not the second tracking state), or an instance in which the first device loses the ability to image the environment due to environmental or processing conditions affecting the first device.

Although not required, the shared mixed-reality map may contain at least one matching set of the one more matching features in the other sub-regions of the mixed-reality map that are omitted from the search performed by the device based on the positioning information from the separate/second device. In particular the positioning information from the second device is used, in some instances, to filter the search of the mixed-reality map to only the sub-region that excludes the other sub-regions and to cause the device to refrain from searching the other sub-regions for the matching features (which may be feature points, landmarks, objects or other identifiable elements of the mapped environment and that are detectable in images taken by the first and or second devices).

It will be appreciated that aspects of the foregoing methods can also be performed independently from analyzing an actual mixed-reality map to identify a location of a device that has become disoriented.

The methods and systems of the invention, for example, are configured to help a device become re-oriented and to identify its position based on shared information from another device that it has a known positional relationship with. In these instances, a first device will perform position tracking within a particular environment to identify its relative position within the environment as the device moves throughout the environment. The device performs the initial position tracking, in a first state, using any combination of the positioning data described herein (e.g., scanning sensor data, motion sensor data and other sensor data, such as, but not limited to GPS and IMU sensor data). The device also identifies a relative position of the device relative to a separate device that shares the environment with the device. This relative position can be a fixed and known relative position based on tracked historical usage, a most recently measured/identified positional relationship, or based on user input that specifies the relative relationship/positioning.

Then, at some point, the device will detect an event associated with an interruption of the position tracking of the device, during which the device transitions from the first tracking state to a second tracking state that is less certain than the first tracking state and that causes a reduced certainty of the relative position of the device within the environment. This may occur, for example, in response to a loss of GPS signal or another interruption that affects the ability of the device to determine its location within the environment.

In this second state, the device will obtain positioning information from the separate/second device which is certain about where it is located/positioned in the environment. Then, the device can infer its own position (e.g., location and/or orientation) within the environment based on the positioning information obtained about/from the second device.

In particular, the device will use the position information from the separate device and the relative position of the device relative to the separate device to determine a new position of the device in the second tracking state and while by conserving resources by refraining from analyzing different portions of the environment to identify a most likely location of the device within the environment and by conserving resources trying to obtain GPS or other sensor data that it does not have access to.

In some instances, the device may also use newly obtained sensor data of the device (e.g., IMU or other motion sensor data or image data that is obtained in the second state) to refine/verify its positioning in the environment (sub-region of the environment). The device can then continue to monitor new sensor data (e.g., IMU data and other sensor data) to update its positioning based on relative movements from the newly determined position, which was determined based on shared data from the second device.

Figure 9:
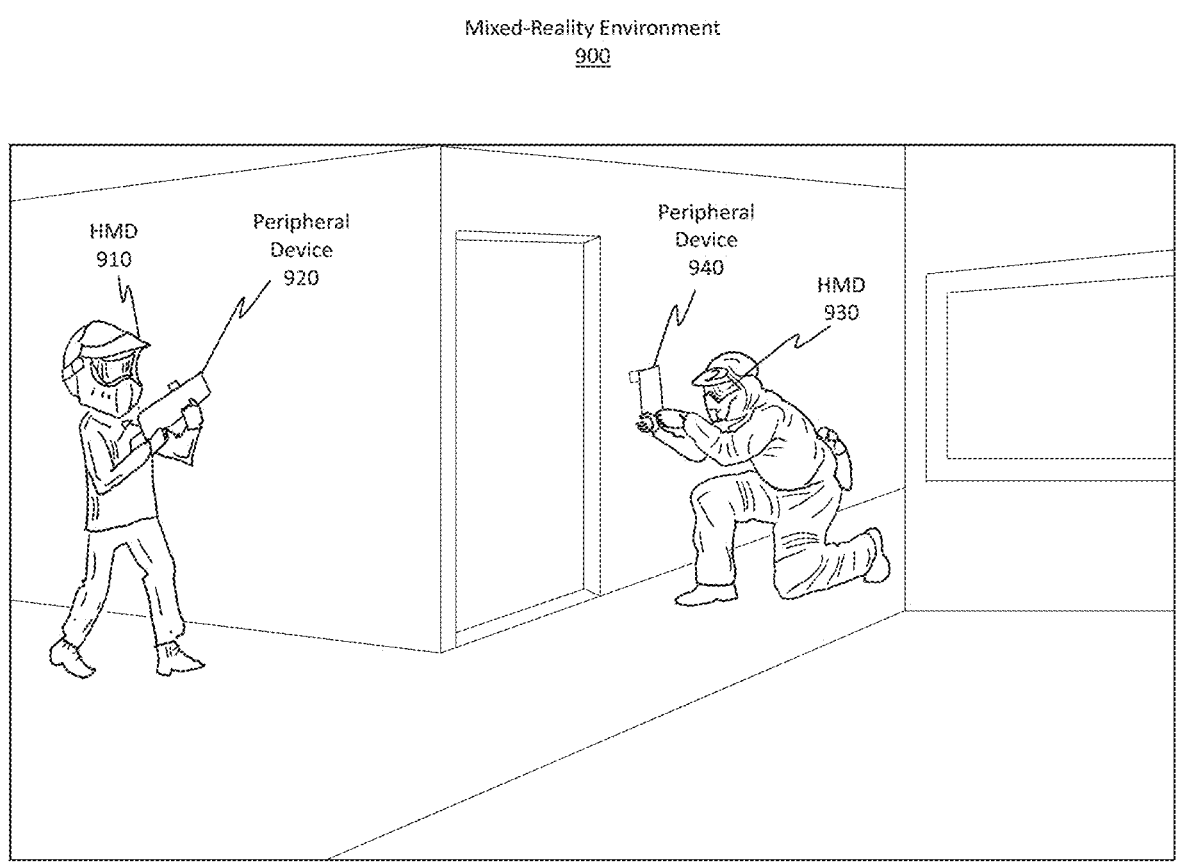
FIG. 9 illustrates another gaming environment in which a plurality of mixed-reality devices are being used and that share a common mixed-reality environment.
Figure 10:
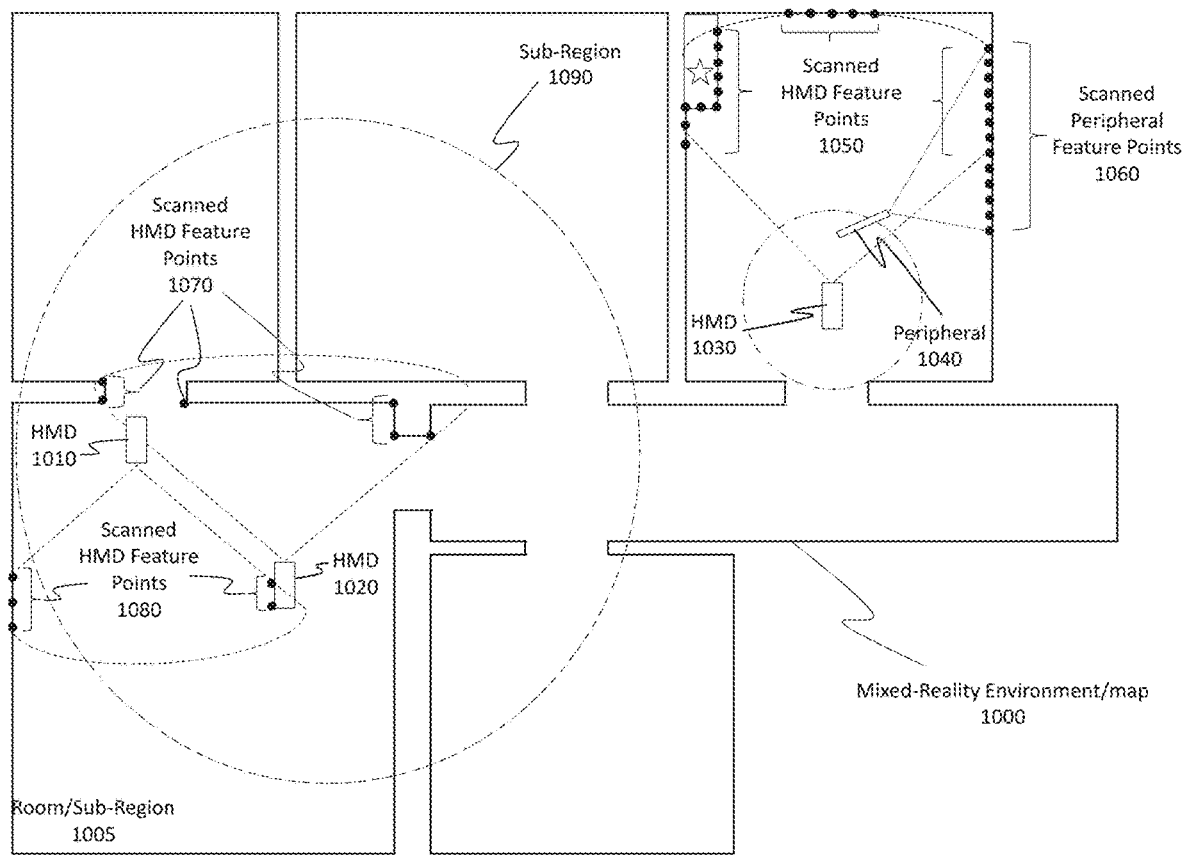
FIG. 10 illustrates various example use cases in which a mixed-reality device may be positioned relative to other mixed-reality devices in a shared mixed-reality environment and/or based on detected and feature points associated with in the mixed-reality environment and corresponding mixed-reality map.

Attention will now be directed to FIGS. 9 and 10, which illustrate additional mixed-reality environments in which multiple users are using multiple corresponding mixed-reality devices and in which the device(s) share positioning information with other devices in the same shared mixed-reality environment which causes at least one of the devices to refrain from analyzing an entire shared mixed-reality environment/map when attempting to identify new positioning within the shared mixed-reality environment/map and in which the search for possible positions within the environment/map are restricted one or more sub-regions of the map identified by or based on shared positioning information from one or more of the other devices that share the mixed-reality environment.

By way of example, the mixed-reality environment 900 of FIG. 9, two users are visible, with a first user wearing a first HMD 910 and holding a peripheral device 920 (e.g., a hologram painting or capture controller). A second user is also wearing an HMD 930 and is holding a peripheral device 940 (e.g., another hologram painting or capture controller). The first peripheral device 920 may be known to be used within a predetermined distance and within a range of orientations relative to the HMD 910. Likewise, the second peripheral device 920 may be known to be used within a predetermined distance and within a range of orientations relative to the second HMD 930. This is important, as each peripheral device (e.g., 920 or 940), and each MR device, may selectively choose which HMD or other mixed-reality device(s) to obtain shared positioning information from to selectively determine which sub-region(s) of a shared mixed-reality map/environment to analyze when trying to position itself within the shared mixed-reality map/environment after transitioning from a first tracking state where it is very certain where it is located (with a high degree of probability based on a first set of sensor data) to a second tracking state where it is less certain where it is located.

In the current scenario, peripheral device 920 may rely on supplemental positioning information from HMD 910, rather than 930 to filter the shared map to the selective/filtered set of sub-regions to search for possible positioning of the peripheral device 920 if and/or when it transitions to a second position tracking state and/or in response to another triggering event. Likewise, peripheral device 940 may rely on supplemental positioning information from HMD 930, rather than 910, to filter the shared map to the selective/filtered set of sub-regions to search for possible positioning of the peripheral device 940 when transitioning to the second position tracking state or in response to another triggering event.

In contrast, HMD 910 may rely on supplemental positioning information from peripheral device 920, rather than peripheral device 940 to filter the shared map to the selective/filtered set of sub-regions to search for possible positioning of the HMD 910 if and/or when it transitions to the second position tracking state and/or in response to another triggering event. However, in these situations, if it is determined that the first and second user are on a same team and are commonly located in the same regions/sub-regions of a shared map, then the HMD 910 may additionally or alternatively rely on supplemental information from the HMD 930, peripheral device 940 and/or the peripheral device 920 when trying to re-position itself within the shared map when/if it transitions to the second position tracking state and/or in response to another triggering event.

In some instances, the triggering event is a determination that a period of time has passed, such as a few seconds, to trigger the verification of a probable positioning within a particular map/environment with a more certain verification/probability of positioning that is achievable in an efficient manner according to this disclosure by relying on supplemental information from the secondary/separate MR device(s) to scan/analyze selective and partial sub-regions of the map/environment. Another triggering event is a loss or lack of sensor data from a scanning, motion, or other location sensor. Yet another triggering event is a determination that a probability valuation for the device is below a predetermined threshold of probability or confidence/certainty, such as below a 95%, 90%, 85%, 80%, 75%, 70% or another confidence/probability of positioning within a shared mixed-reality environment.

Attention will now be directed to FIG. 10, which illustrates a mixed-reality environment/map 1000 in which a first HMD device 1010, a second HMD device 1020 and a third HMD device 1030 are located. The third HMD device 1030 is also associated with a peripheral device 1040 that is known to be within a predetermined position of the HMD device 1030 based on tracked and/or predetermined use attributes of the peripheral device 1040 relative to the HMD device 1030.

In this scenario, each of the HMD devices may be uncertain as to their exact locations within the mixed-reality environment/map 1000. Such an occurrence may result, for example, from a triggering event in which a game instance loads a new map for each of the different users to begin playing from. When the map is first loaded, they are not certain where they are in the shared map, as they have not scanned enough of the map to be certain. Other triggering events for situations in which multiple devices are uncertain about their locations can result from global application failures or glitches in location services that communicate with each of the devices.

Regardless of the triggering event, aspects of the disclosed invention can be used to facilitate each of the devices newly positioning themselves, repositioning themselves and/or increasing confidence in their estimated positioning by relying on positioning information from the other devices and, thereby, restricting subsequent searching in the mixed-reality map/environment to one or more limited sub-regions of the shared environment/map for matching features/objects that correspond to features/objects that each of the objects detect with their own sensors and without requiring a full exhaustive search through the entire map/environment for matching features/objects.

In this scenario, for example, the HMD 1010 may form a certain probability that it is in a certain sub-region of the shared map (a very low probability) as well as a probability that it is within a certain proximity to the HMD 1020 (a very high probability) based on detected/scanned HMD feature points 1080. The low probability of being in any particular sub-region of the map may be based on only identifying a few feature points 1080 that are likely to exist in a plurality or many other regions of the shared map.

In contrast, HMD 1020 may develop a very high probability it is in a particular sub-region of the map, knowing it has identified two door entrances, based on its scanned HMD feature points 1070 and since there is only a single room (sub-region), excluding a hall that has two perpendicularly facing door entrances. In fact, all occurrences of two perpendicular door openings occur only within the sub-region 1090 of the mixed-reality environment/map 1000. Accordingly, the HMD 1020 and HMD 1010 can limit their search for matching features/objects to the sub-region 1090 and without having to search the entire mixed-reality map for matching features/objects to the scanned feature points.

Likewise, if HMD 1030 can develop certainty or a certain probability valuation as to its relative location within the environment/map 1000 based on its scanned HMD feature points 1050, that information can be conveyed to peripheral 1040 when peripheral 1040 loses its bearings and needs to verify or update its positioning based on its scanned peripheral feature points 1060. This information can cause peripheral 1040 to restrict its search for matching objects/features in the map that correspond to the scanned peripheral feature points 1060 to only the selected sub-regions of the map 1000 that are visible from locations that are a predetermined distance from the HMD 1030 that the peripheral device 1040 is associated with.

If/when the HMD 1030 needs to update its positioning based on shared positioning information, it can also omit the room/sub-region 1005 in which HMD 1010 and 1020 are located since those devices can share positioning information to HMD 1030 that they are in a particular room/sub-region 1005, which is also a portion of the map where HMDs 1010 and 1020 are highly certain that HMD 1030 is not present in (due to their observations about the room 1005) and such that 1030 can omit the analysis and attempted matching of features/objects in room/sub-region 1005 from the other portions/sub-regions of the map 1000 that are analyzed during the processing of updating positioning for HMD 1030. This shared information will save processing resources when positioning the HMD 1030 in the environment.

Figure 11:
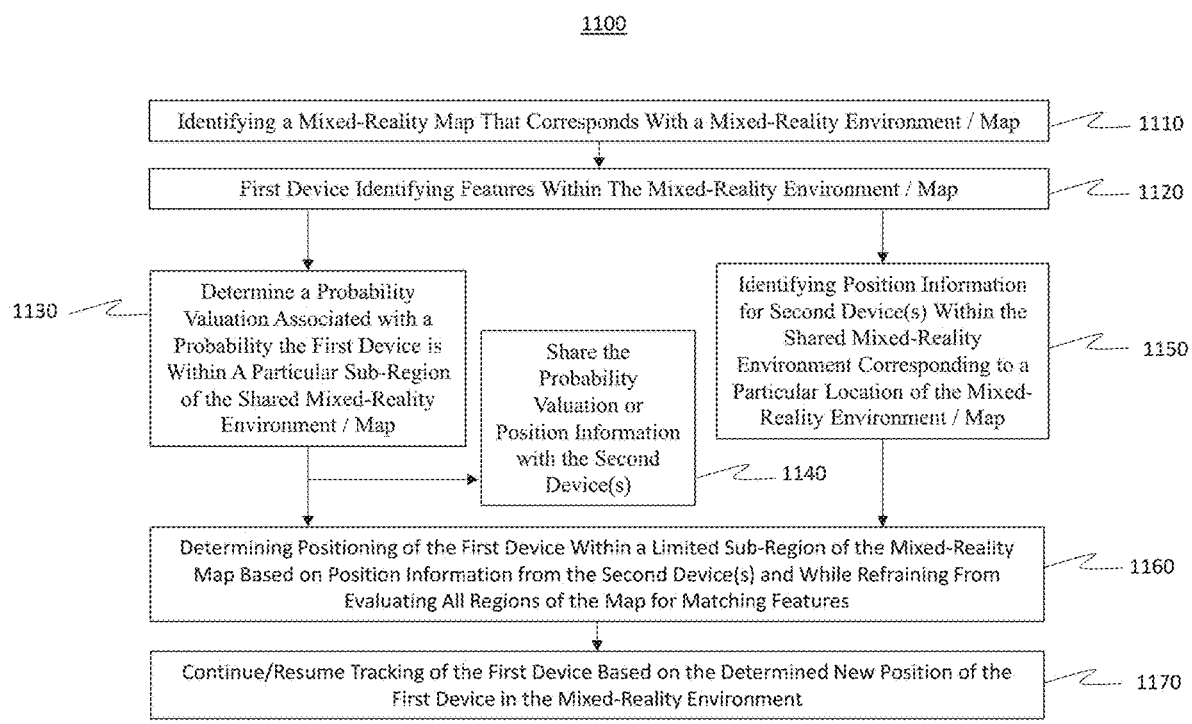
FIG. 11 illustrates a flow diagram with various acts associated with positioning mixed-reality devices.

The foregoing examples are even more evident in view if the referenced acts and methods referenced in the flow diagram 1100 of FIG. 11, in which MR devices are configured to share position information to assist other MR devices identify their positioning while refraining from analyzing unnecessary portions of a shared mixed-reality environment/map based on the shared position information. As described below, the various acts can be performed by a single MR device (also referred to as system). Additionally, or alternatively, the acts can be performed by and/or controlled by a server that causes one or more of the acts to be performed by instructions sent from the server to the referenced first and/or second devices.

The first illustrated act in the flow diagram 1100 includes an act of identifying a mixed-reality map corresponding with the shared environment/map in which a first and one or more second devices are located (act 1110). As noted before, this can be a scanned and generated map, or a shared map obtained from a remote and/or third-party system. In this example, a first device using the shared mixed-reality environment/map also identifies features within that environment (act 1120) using scanned information obtained by its sensors while in the environment.

Next, the first device determines a probability valuation associated with a probability that the first device is within a particular sub-region of the shared mixed-reality environment (act 1130). There are various techniques and processes that can be used to identify a probability valuation (value) associated with a probability that a device is in a certain position relative to a known map. This valuation can be based on various factors, such as uniqueness of detected features, quantity of detected features, image quality, consistency in scanned images, as well as many other factors. The valuation can also be based on shared position information from one or more other devices. The valuation can also be based on a size and complexity of the shared environment/map.

Once the valuation is determined (which may comprise a value according to any preferred scale and valuation scheme), that value/valuation information and corresponding position information used to form the valuation may be shared with one or more second devices that share the mixed-reality environment/map (act 1140). Likewise, the position information and/or probability valuation(s) formed by the second devices, relative to their positions in the shared environment/map, may also be shared with the first device (act 1150). This sharing of information may occur through a push or pull scheme, in response to a request from the first device and/or without a request from the first device.

The illustrated flow diagram 1100 also includes an act of determining positioning of the first device within a limited sub-region of the mixed-reality map/environment that is selectively identified and based on the position information from the second device(s) (act 1160). This act may include, for example, examining and searching the limited sub-region of the map while affirmatively refraining from evaluating other portions/sub-regions of the map for features/objects that match the features (e.g., feature points, objects, landmarks) identified by the first device in act 1120.

In some instances, the first device determines which portions of the map to refrain from searching based on an analysis of the relative probability valuations of the first device and the second device(s). This may include ignoring some position information from some second devices and/or preferentially treating position information from devices that have higher probability valuations. For instance, if one second device (device A) has a low probability valuation for its determined location, while another device (device B) has a higher probability valuation for its determined location, then the first device may consider the position information of device A, while ignoring the position information from device B, while determining which sub-regions of the map to include and exclude from a search for features/objects that match the features/objects it has identified in its limited scan of the environment.

A known or determined proximity or lack of proximity between the first device and one or more of the secondary devices can also be considered when determining which position information to use when identifying portions of the map to include or exclude from a search for matching features/objects.

Once the first device is able to re-determine or verify its position within the shared map, and particularly within the searched sub-region of the map, based on the limited/qualified search of the map, the device will continue/resume tracking of the first device positioning based on the newly determined/verified position of the device within the mixed-reality environment (act 1170). The continued/resumed tracking may include the performance of updated position tracking of the device based on the determined new position of the device as well as newly identified/obtained sensor data based on new motion of the device in the environment.

Example Computer/Computer Systems

Figure 12:
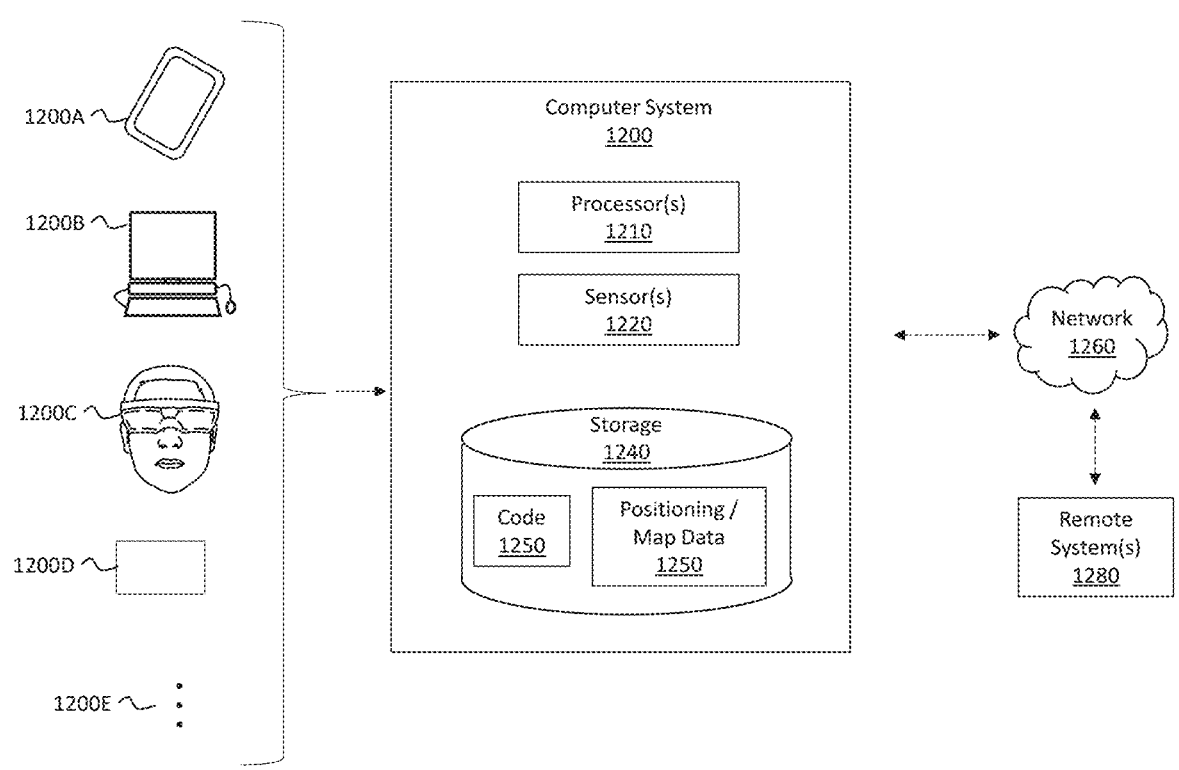
FIG. 12 illustrates additional example computer systems and components that may include and/or be used to perform aspects of the disclosed invention.

Attention will now be directed to FIG. 12 which illustrates another example of a computer system 1200 that may include and/or be used to perform any of the operations described herein. Computer system 1200 may take various different forms. For example, computer system 1200 may be embodied as a tablet 1200A, a desktop or laptop 1200B, a wearable HMD 1200C, a peripheral controller 1200D (shown abstractly as a box, but which may take any form), a mobile device, or any other type of standalone device, as represented by the ellipsis 1200E. Computer system 1200 may also be a distributed system that includes one or more connected computing components/devices that are in communication with computer system 3000. In some instances, the computer system 1200 is a MR inside out tracking device.

In its most basic configuration, computer system 1200 includes various different components. FIG. 12 shows that computer system 1200 includes one or more processor(s) 1210 (aka a "hardware processing unit") and storage 1240. As discussed previously, the computer system 1200 may also include any number or type of cameras or other sensor (s) 1220.

Regarding the processor(s) 1210, it will be appreciated that the functionality described herein can be performed, at least in part, by one or more hardware logic components (e.g., the processor(s) 1210). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Storage 1240 may be physical system memory, which may be volatile, non-volatile, or some combination of the two. The term "memory" may also be used herein to refer to non-volatile mass storage such as physical storage media. If computer system 1200 is distributed, the processing, memory, and/or storage capability may be distributed as well.

Storage 1240 is shown as including executable instructions (i.e., code 1250). The executable instructions represent instructions that are executable by the processor(s) 1210 of computer system 1200 to perform the disclosed operations, such as those described in the various methods.

The disclosed embodiments may comprise or utilize a special-purpose or general-purpose computer including computer hardware, such as, for example, one or more processors (such as processor(s) 1210) and system memory (such as storage 1240), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras) or devices and third-party systems and/or other remote systems 1280 via a network 1260. For example, computer system 1200 can communicate with any number devices (e.g., remote system(s) 1280) and other MR devices 1200E or cloud services to obtain or process data. In some cases, network 1260 may itself be a cloud network.

A "network," like network 1260, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1260. Transmission media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining positioning of a device based on image data captured by the device, the method comprising:
    identifying a mixed-reality map corresponding with an environment;
    performing position tracking of the device within the environment, while in a first tracking state, to identify a relative position of the device within the mixed-reality map as the device moves within the environment in the first tracking state;
    detect an event associated with an interruption of the position tracking of the device during which the device transitions from the first tracking state to a second tracking state that is less certain than the first tracking state and that causes a reduced certainty of the relative position of the device within the environment and corresponding mixed-reality map;
    obtaining positioning information from a separate inside out tracking device in the environment, the positioning information from the separate inside out tracking device identifying a relative position of the separate inside out tracking device inside of a sub-region of the mixed-reality map and that also indicates the device is within a same sub-region of the mixed-reality map as the separate inside out tracking device;
obtaining one or more images with one or more camera sensors of the device;
identifying one or more imaged features in the environment from the one or more images;
searching a particular sub-region of the mixed-reality map for a matching set of one or more matching features that match the one or more imaged features and while refraining searching other sub-regions of the mixed-reality map for the matching set of one more matching features and in a manner that conserves computational expense that would otherwise be associated with searching the other sub-regions of the mixed-reality map for the one or more matching features;
determining a new position of the device within the sub-regions of the mixed-reality map based on finding the matching set of one or more matching features in the sub-region of the mixed-reality map and based on correlating a relative position of the device from the one or more imaged features and corresponding one or more matching features in the sub-region; and
resuming the position tracking of the device based on the determined new position of the device.

2. The method recited in claim 1, wherein the separate inside out tracking device comprises an HMD (Head Mounted Device).

3. The method recited in claim 2, wherein the device comprises a peripheral device that is a controller that shares the mixed-reality map and a corresponding mixed-reality application instance with the HMD, the controller being operable to interact with one or more interactive virtual objects rendered to a user through the HMD.

4. The method recited in claim 2, wherein the device comprises a first HMD worn by a first user and the separate inside out tracking device comprises a second HMD worn by a second user, the first and second HMDs rendering one or more common virtual objects in a shared application.

5. The method recited in claim 1, wherein the environment comprises a global positioning system (GPS) denied environment.

6. The method recited in claim 1, wherein the mixed-reality map contains at least one matching set of the one more matching features in the other sub-regions of the mixed-reality map that are refrained from being searched by the device based on the positioning information from the separate inside out tracking device that is used to filter a search of the mixed-reality map to only the sub-region that excludes the other sub-regions.

7. The method recited in claim 1, where determining the new position includes determining a relative location and orientation of the device within the mixed-reality map.

8. A method for determining positioning of a device based on sensor data detected by the device and positioning information obtained from another device, the device comprising:
performing position tracking of the device within an environment to identify a relative position of the device as the device moves within the environment by analyzing sensor data obtained by the device while in a first tracking state;
identifying a relative position of the device relative to a separate inside out tracking device that shares the environment with the device;
detect an event associated with an interruption of the position tracking of the device during which the device transitions from the first tracking state to a second tracking state that is less certain than the first tracking state and that causes a reduced certainty of the relative position of the device within the environment;
obtaining positioning information from the separate inside out tracking device in the environment, the positioning information from the separate inside out tracking device identifying a relative position of the separate inside out tracking device inside of a sub-region of the environment; and
using the position information from the separate inside out tracking device and the relative position of the device relative to the separate inside out tracking device to determine a new position of the device in the second tracking state and while conserving resources by refraining from analyzing different portions of the environment to identify a most likely location of the device within the environment.

9. The method of claim 8, wherein the method further comprises configuring the device to update the new position based on new sensor data comprises IMU sensor data obtained by the device while the device moves in the environment.

10. The method of claim 9, wherein the relative position of the device relative to a separate inside out tracking device includes a relative location and orientation of the device relative to the separate inside out tracking device.

11. The method recited in claim 9, wherein the mixed-reality map contains at least one matching set of the one more matching features in the other sub-regions of the mixed-reality map that are refrained from being searched by the device based on the positioning information from the separate inside out tracking device that is used to filter a search of the mixed-reality map to only the sub-region that excludes the other sub-regions.

12. The method recited in claim 9, wherein the separate inside out tracking device comprises an HMD (Head Mounted Device).

13. The method recited in claim 12, wherein the device comprises a peripheral device that is a controller that shares the mixed-reality map and a corresponding mixed-reality application instance with the HMD, the controller being operable to interact with one or more interactive virtual objects rendered to a user through the HMD.

14. The method of claim 8, wherein determining the new position of the device further includes:
identifying a mixed-reality map corresponding with the environment;
obtaining one or more images with one or more camera sensors;
identifying one or more imaged features in the environment from the one or more images;
searching a particular sub-region of the mixed-reality map that corresponds to the environment for a matching set of one or more matching features that match the one or more imaged features and while refraining searching other sub-regions of the mixed-reality map for the matching set of one more matching features and in a manner that conserves computational expense that would otherwise be associated with searching the other sub-regions of the mixed-reality map for the one or more matching features;
determining the new position of the device within the sub-regions of the mixed-reality map based on finding the matching set of one or more matching features in the sub-region of the mixed-reality map and based on correlating a relative position of the device from the one or more imaged features and corresponding one or more matching features in the sub-region; and resuming the position tracking of the device based on the determined new position of the device.

15. The method recited in claim 8, wherein the sensor data includes GPS data that is used by the device in the first tracking state and that is refrained from being used in the second tracking state.

16. A method for determining positioning of a device based on image data captured by the device, the device comprising:

identifying a mixed-reality map corresponding with an environment;

obtaining one or more images with the one or more camera sensors of the device;

identifying one or more imaged features in the environment from the one or more images;

searching a particular sub-region of the mixed-reality map for a matching set of one or more matching features that match the one or more imaged features and while refraining searching other sub-regions of the mixed-reality map for the matching set of one more matching features and in a manner that conserves computational expense that would otherwise be associated with searching the other sub-regions of the mixed-reality map for the one or more matching features;

determining a probability valuation associated with probability that the device is within the sub-region of the mixed-reality map based on the searching;

receiving position information from a second device comprising a separate probability valuation that the second device, which separate from the first device, is within a particular location of the mixed-reality map based according to a certain probability valuation; and determining a new position of the device within the mixed-reality map based on the position information from the second device and the probability valuation of the device and the certain probability valuation of the second device.

17. The method of claim 16, the method further comprising configuring the device to perform updated position tracking of the device based on the determined new position of the device and new sensor data obtained by the device relative to new motion of the device in the environment.

18. The method of claim 17, wherein determining the new position of the device comprise determining that the device is within the particular sub-region of the mixed-reality map.

19. The method of claim 17, wherein the second device is an inside out tracking device.

20. The method of claim 17, wherein the position information from the second device further specifies a proximity of the second device to the device.

* * * * *